United States Patent [19]

Barnadas

[11] Patent Number: 5,174,942
[45] Date of Patent: Dec. 29, 1992

[54] METHOD AND APPARATUS FOR PRODUCING FLASHLESS AXIAL LEADED DEVICES

[75] Inventor: Rodolfo G. Barnadas, Mesa, Ariz.

[73] Assignee: Motorola, Inc., Schaumburg, Ill.

[21] Appl. No.: 706,716

[22] Filed: May 29, 1991

[51] Int. Cl.⁵ .............................................. B29C 45/14
[52] U.S. Cl. ................................ 264/272.15; 264/278; 264/328.8; 264/328.9; 425/129.1; 425/441; 425/556; 425/572
[58] Field of Search ............... 425/129.1, 110, 123, 425/125, 554, 556, 572, 588, 436 R, 438, 441, 443; 264/328.8, 328.9, 334, 278, 272.11, 272.15, 272.16, 272.17, 272.18

[56] References Cited

U.S. PATENT DOCUMENTS

| | | | |
|---|---|---|---|
| 3,542,328 | 11/1970 | Deitrick | 425/129.1 |
| 3,685,784 | 8/1972 | Spanjer | 425/129.1 |
| 4,236,689 | 12/1980 | Hass | 425/129.1 |

Primary Examiner—Tim Heitbrink
Attorney, Agent, or Firm—Joe E. Barbee

[57] ABSTRACT

A flashless mold for encapsulating axial leaded devices (24) with a protective plastic material. The plastic material is introduced through a gate (27) which is positioned such that the leads of the electronic devices (24) are not wetted by the plastic material. This gate design, combined with a tight fitting groove for the terminal wires eliminates flash on the terminal wires. A spring retainer (28) acts to hold the individual devices accurately in place in the mold cavity facilitating loading and unloading of the mold.

14 Claims, 2 Drawing Sheets

METHOD AND APPARATUS FOR PRODUCING FLASHLESS AXIAL LEADED DEVICES

BACKGROUND OF THE INVENTION

The present invention relates, in general, to plastic encapsulation of small electronic devices, and more particularly to flashless molding of axial leaded devices.

Many types of electronic components, such as resistors, capacitors, and diodes, are encapsulated in an electrically insulating plastic material with the terminal wires of the component projecting from the encapsulating material. The easiest and least expensive manner of encapsulating such components on a mass production basis is to transfer mold the encapsulating material around the components. A problem with transfer molding is the removal of the flash which is formed around each of the encapsulated components, including flash along a portion of the terminal wires. Although the flash is thin and brittle, it adheres to the terminal wires and is difficult to remove completely. Typically this flash must be removed by chemical means, an expensive and difficult process due to the chemicals required.

Among other requirements, a flashless mold design requires a tight fit between the terminal wires and the matching wire grooves in the mold. This tight fit makes accurate alignment of the terminal wires in the grooves extremely critical. A lead which is even slightly misaligned will be crushed and require that the part be scrapped. In addition the tight fit tends to hold the terminal wires in the grooves when the mold is opened after the molding process is completed, damaging devices which happen to stick to the top half of the mold and complicating the removal of all devices from the mold.

Clearly there is a need for a mold for axial lead devices which does not produce flash and which facilitates loading and unloading of the devices from the mold.

SUMMARY OF THE INVENTION

Briefly stated, the present invention provides a flashless mold for axial leaded devices with a spring retainer to facilitate loading and unloading of the mold. The plastic material is introduced through a gate which is positioned so the terminal wires are not wetted by the plastic material. This gate design, combined with a tight fitting groove for the terminal wires eliminates any flash on the terminal wires. The spring retainer acts to position the individual devises accurately in place in the mold cavity facilitating loading and unloading of the mold.

DETAILED DESCRIPTION OF THE DRAWINGS

Figure 1:
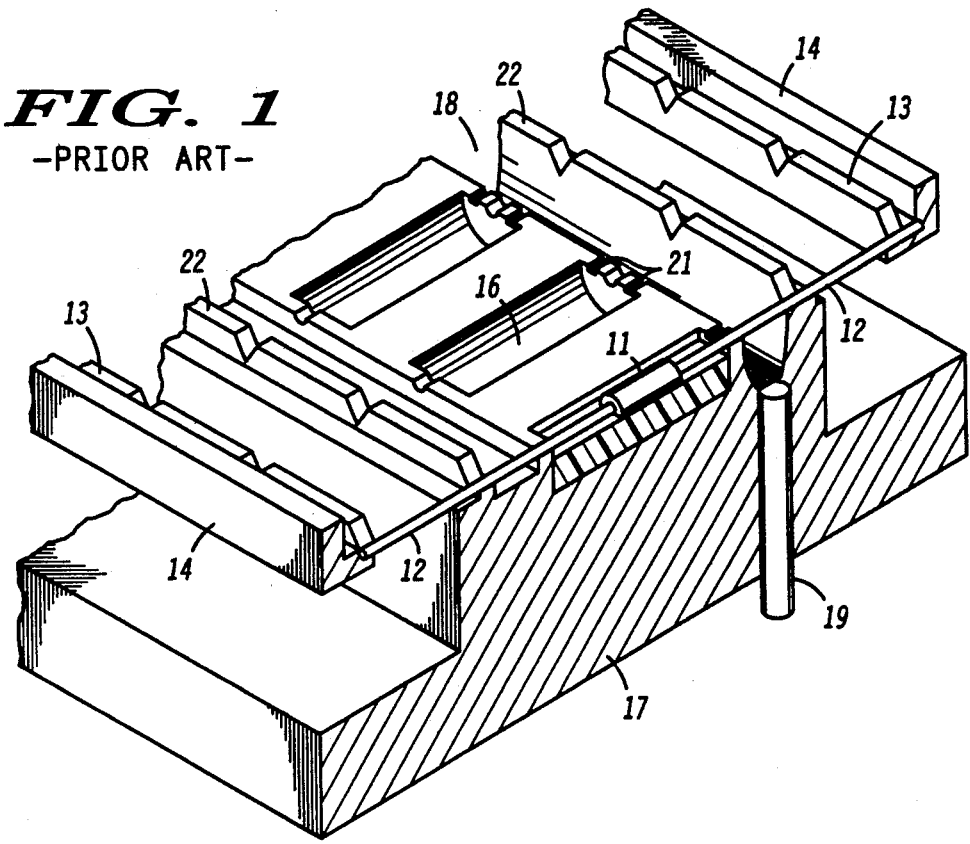
FIG. 1 shows an isometric cross section view of a mold according to the prior art.

FIG. 1 shows an isometric cross section view of a mold 17 according to the prior art. An electronic device 11 having two axial leads 12 is supported by a mold rack 14. Axial leads 12 are positioned by means of a plurality of V-grooves 13 which align with a plurality of "V" shaped mold guides 22 which are fabricated as part of mold 17. Next mold 17 is mated with a matching upper mold half (not shown). A quantity of molten plastic mold material is introduced into the mold under pressure, passing along a runner 18, through a gate 21 and into a mold cavity 16, completely encapsulating electronic device 11 and wetting axial lead 12 in the process.

After the plastic material has cooled and hardened, an ejector pin 19 is used to help remove electronic device 11 from mold 17. Much of the flash material is removed by breaking the plastic at areas which are pre-thinned by gate 21, however since axial lead 12 is wetted by the plastic material some plastic material will adhere to axial lead 12 and must be removed chemically. Typically a stripper selected from a plurality of commercially available phenol based A20 chemical strippers is used. The phenol based A20 chemical stripper is classed as a hazardous material making it difficult as well as expensive to store and handle. Some devices may be destroyed by the effects of the phenol based A20 chemical stripper so a silicone plastic must be used for the plastic material rather than an epoxy such as MG39F. The silicone plastic does not adhere to axial leads 12 facilitating the removal of flash, but the silicone plastic is three times the cost of the epoxy. The wetting and chemical flash removal require that axial leads 12 be nickel plated, further adding to the cost. The mold rack and mold design requires that a custom mold be fabricated for each type of component to be encapsulated. In addition, after molding is completed some components stick to the upper mold half and must be scrapped. An improved mold and associated mold rack which addresses these problems can improve safety as well as reducing the cost of encapsulation.

Figure 2:
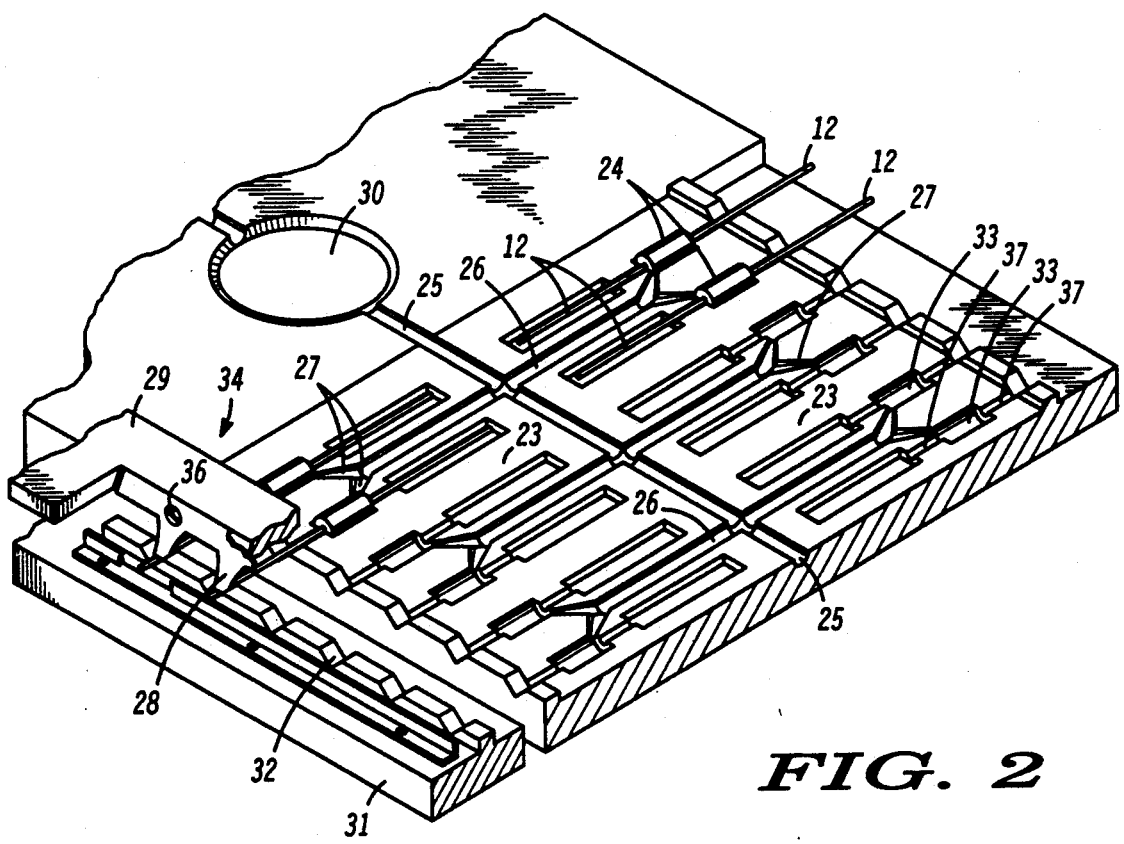
FIG. 2 shows an isometric view of a flashless mold in accordance with the present invention.

FIG. 2 shows an isometric view of a mold 23 illustrating one embodiment of the present invention. Mold 23 accommodates a plurality of electronic devices 24 each having two axial leads 12. Electronic devices 24 are shown after encapsulation by a plastic material. A plurality of mold cavities 33 are shown each surrounding one electronic device 24. For purposes of illustration various mold cavities 33 are shown; some empty and some filled with one encapsulated electronic device 24. In actual use all mold cavities 33 would be filled with electronic devices 24. During the molding process, mold 23 is mated with a matching upper mold half (not shown). Since axial leads 12 are not wetted by molding fluid, an epoxy material is used rather than a more expensive silicone plastic. The molding fluid is introduced to mold cavities 33 through a plurality of gates 27 which are in turn fed from a plurality of subrunners 26. Subrunners 26 are fed by a runner 25 which transports the molding fluid from a mold pot 30. Gates 27 are arranged to allow the plastic material to enter mold cavity 33 without wetting any part of axial leads 12 outside of mold cavity 33. As a result no flash will form on axial leads 12 and hence no chemical removal step is required. To ensure even wearing of the gate by the plastic material, gates 27 are formed in a symmetrical cone shape with the apex of the cone at the point of entry into mold cavity 33.

This gate design, combined with a tight fitting groove 37 for axial leads 12 eliminates any flash on axial leads 12.

Figure 3:
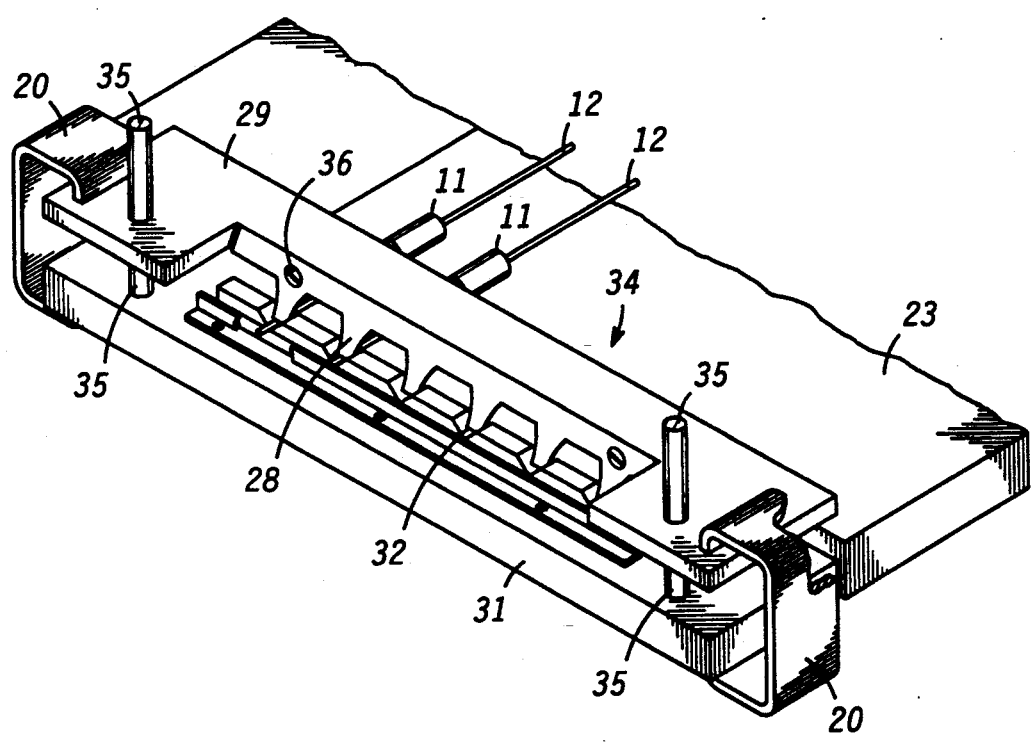
FIG. 3 shows a perspective view of a mold rack held closed by a spring loaded closure means.

A mold rack 34 allows all electronic devices 24 to loaded and unloaded to and from mold 23 together rather than requiring that each electronic device 24 be inserted individually. This bulk handling of electronic devices 24 greatly facilitates loading and unloading of mold 23. Mold rack 34 comprises an upper rack half 29 having a plurality of comb springs 28 and a lower rack half 31 having a plurality of V-grooves 32. Comb springs 28 are fastened to upper rack half 29 by a fastener 36. During loading and unloading of mold 23, a single axial lead 12 from each electronic device 24 is held in a single V-groove 32 by a single comb spring 28. As a result, electronic devices 24 are held firmly in position during loading and unloading of mold 23 by a single axial lead 12. An alternative embodiment of the present invention allows mold rack 34 to be detached from mold 23 so that loading and unloading may be separated from the mold. Mold rack 34 is intended to facilitate the positioning of electronic devices 24 within mold 23, even so a small misalignment between electronic devices 24 and mold 23 may exist. The result is that the leads of electronic devices 24 may not rest precisely in proper position on mold 23 but are held at a slight angle. When this happens, axial leads 12 may be bent or electronic device 24 may break due to the stress as the mold closes. This requires that electronic device 24 be scrapped. To avoid this harmful stress the mold rack 34 is constructed with a spring loaded closure means 20, as shown in FIG. 3, and mold rack 34 is opened by the action of closing the mold so as to remove pressure from spring comb 28 on the axial leads. A pin 35 attached to the upper mold half (not shown) forces lower rack half 31 to separate from upper rack half 29 as mold 23 is closed. This action gently releases axial leads 12 from comb spring 28 and allows electronic devices 24 to rest in cavities 33.

By now it should be clear that a flashless mold for axial leaded devices in accordance with the present invention has numerous advantages. The hazardous and expensive chemical removal of flash from axial leads 12 is no longer required, a less costly plastic material may be used, and axial leads 12 no longer need to be specially plated. The mold including the spring clamp and rack may be used for a variety of axial leaded devices and provides a fast, accurate way to load and unload devices from the mold while minimizing the possibility of damage to the devices during the process. The overall effect is a less costly procedure which in addition reduces the percentage of scrapped devices.

I claim:

1. A method for flashless molding of axial leaded devices, comprising:
   - providing a plurality of axial leaded devices requiring encapsulation;
   - providing a mold having a plurality of mold cavities, each cavity surrounding a portion of a corresponding axial leaded device to be encapsulated;
   - providing a mold rack to support the leads of the axial leaded devices;
   - providing a spring comb on the mold rack to hold the leads of the axial leaded devices in position on the mold rack;
   - positioning the mold rack onto the mold in such a way that the axial leaded devices are accurately located in the mold cavities at a predetermined position; and
   - introducing a molding fluid into the mold cavities through a corresponding gate positioned such that the portion of the axial leaded devices leads which are outside of the mold cavities are not wetted by a molding fluid.

2. The method for flashless molding of axial leaded devices of claim 1 further comprising:
   holding the axial leaded devices in a V-groove by a single lead.

3. The method for flashless molding of axial leaded devices of claim 1 further wherein each gate is in the shape of a symmetrical cone having its apex at the corresponding cavity.

4. The method for flashless molding of axial devices of claim 1 further comprising:
   releasing pressure from the spring comb as the mold is closed.

5. The method for flashless molding of axial leaded devices of claim 1 further comprising:
   detaching the mold rack from the mold, the mold rack serving as a carrier to facilitate loading and unloading of the devices.

6. A flashless mold for axial leaded devices, comprising:
   a mold;
   a plurality of axial leaded devices;
   a plurality of mold cavities fabricated within the mold, each cavity surrounding a portion of a corresponding axial leaded device to be encapsulated and each cavity having a gate positioned such that leads of the leaded devices outside of the mold cavities are not wetted by a molding fluid used for encapsulation of the axial leaded devices;
   a mold rack attached to the mold so as to support the leads of the axial leaded devices in a predetermined position within the mold; and
   a spring comb fastened to the mold rack for holding the leads of the axial leaded devices on the mold rack.

7. The flashless mold for axial leaded devices of claim 6 wherein the spring comb holds each axial leaded device in a V-groove by a single lead.

8. The flashless mold for axial leaded devices of claim 6 wherein each gate has a symmetrical cone shape with its apex at the corresponding mold cavity.

9. The flashless mold for axial leaded devices of claim 6 further including means to release pressure from the spring comb as the mold is closed.

10. The flashless mold for axial leaded devices of claim 6 wherein the mold rack is separable from the mold and serves as a carrier to facilitate loading and unloading of the axial leaded devices.

11. A flashless mold for axial leaded devices, comprising:
    a mold;
    a plurality of axial leaded devices;
    a mold rack used to facilitate loading and unloading of the axial leaded devices from corresponding cavities in the mold;
    a spring comb which holds the leads of the axial leaded devices in position on the mold rack; and
    a means to position the mold rack onto the mold such that the portion of the axial leaded devices to be encapsulated are accurately positioned in the corresponding mold cavity.

12. The flashless mold for axial leaded devices of claim 11 further comprising:
    a symmetrical cone shaped gate for each mold cavity, each gate positioned so leads of the axial leaded devices outside of the mold cavities are not wetted by a molding fluid used to encapsulate the axial leaded devices.

13. The flashless mold for axial leaded devices of claim 11 wherein the mold rack is constructed with a spring loaded closure and the mold rack is opened by the action of closing the mold so as to remove pressure from the spring comb on the axial leads.

14. The flashless mold for axial leaded devices of claim 11 further comprising:
- a tight-fitting groove associated with each cavity to provide a tight fit between each axial lead and the mold.

* * * * *